Patented May 11, 1943

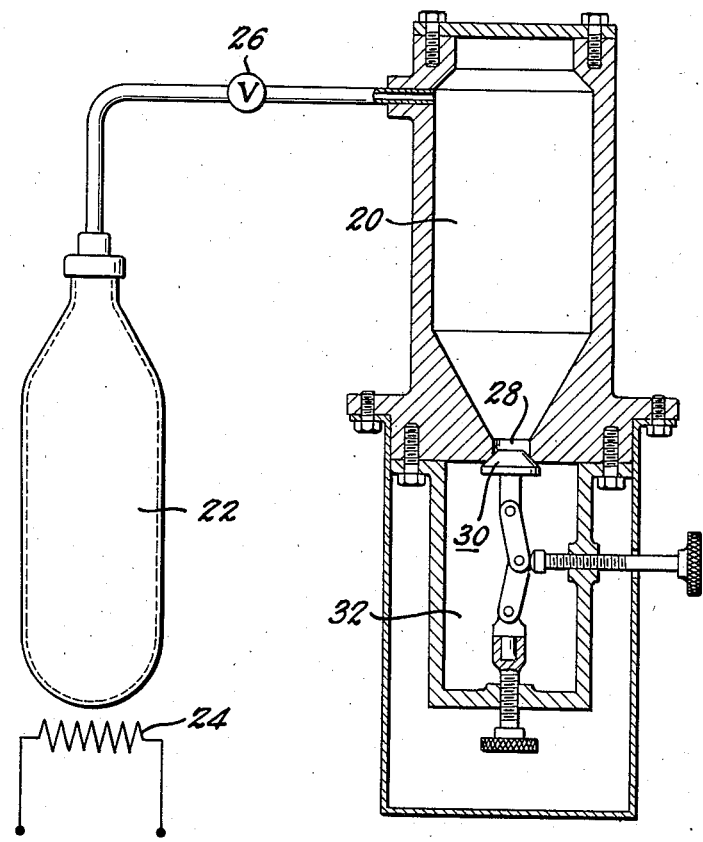

2,318,693

UNITED STATES PATENT OFFICE 2,318,693

METHOD OF SHREDDING RUBBER

William J. Joyce and Harvey D. Geyer, Dayton, Ohio, assignors to General Motors Corporation, Detroit, Mich., a corporation of Delaware Application November 29, 1939, Serial No. 306,636

2 Claims. (Cl. 260—767)

This invention relates to a process of shredding or exploding rubber-like material.

An object of the invention is to provide a method for shredding rubber-like material wherein a fluid is dissolved into the material under suitable high pressures and then by instantaneous reduction of the pressure the solubility of the fluid is reduced for causing the rubber-like material to explode and thereby be shredded.

In carrying out the above object a further object of the invention is to use a compressible fluid that has no deleterious effects on the rubber-like material and which has thermo-dynamic properties which permit the desired action at sufficiently low temperatures to prevent injury to the rubber-like material.

It is a still further object to use such soluble compressible fluids as ammonia, sulphur dioxide, methyl chloride etc.

Further objects and advantages of the present invention will be apparent from the following description, reference being had to the accompanying drawing wherein preferred embodiment of the present invention is clearly shown.

In the drawing the figure shows a schematic layout of the explosion apparatus.

Rubber-like material as herein noted, which defines rubber, crude, compounded, either vulcanized or unvulcanized, reclaimed rubber, synthetic rubbers such as polymerized chloroprene, polymerized isoprene and the like has a solvent action upon certain fluids, such fluids including, ammonia, methyl chloride, sulphur dioxide, hydrogen sulphide, nitrous oxide, propane, ethane, ethylene etc., or suitable mixtures thereof. When such fluids are dissolved into the rubber-like material under high pressure, it is possible to shred or explode the rubber by subsequently releasing the pressure whereby the solubility of the fluid is reduced which causes an expansion of the fluid within the rubber thereby causing a shredding action on the rubber.

When choosing a compressible fluid, for the herein described purpose, care should be exercised to choose a fluid which has no deleterious effects on the material, that is, a fluid should be chosen which has the proper thermodynamic properties to permit solution without undesirable chemical action and without an increase in temperature sufficient to injure the rubber-like material.

We are aware of the Mason Patent 1,578,609, wherein steam is used in connection with porous material, in this instance the steam enters the pores of the wood at an elevated pressure and upon a release of the pressure the steam which is in a compressed condition is released to cause the wood to become comminuted. Our process is entirely different, since we propose to operate upon non-porous material such as rubber, and we further propose to use a fluid which is soluble in rubber and which, in addition, will permit the desired action at sufficiently low temperatures to prevent injury to the material.

In order to more clearly define our invention the following specific example is given in illustrative purposes only. Unvulcanized rubber, preferably in thin section, is placed in a chamber 20 so that it is sealed from the atmosphere, ammonia vapor is introduced into a separate container 22 and is heated therein by suitable means such as, element 24, to a high pressure approximating 1500 lbs. per sq. inch. The vapor is then admitted to the chamber 20 containing the rubber by operation of valve 26 whereupon the vapor is dissolved into the rubber. The chamber 20 containing the rubber, is provided with a small orifice outlet 28 which is controlled by a suitable valve mechanism 30 and after a predetermined time has elapsed to permit the desired solution of the vapor in the rubber, the valve 30 is opened and the rubber containing the dissolved vapor is blown through the orifice 28 into a chamber 32 which is preferably maintained at substantially atmospheric pressure. It is apparent, that as the rubber passes through the orifice at high velocity, that the pressure drop approximates 1500 lbs. per sq. inch whereupon the solubility of the ammonia vapor is greatly reduced in the rubber, giving rise to expansion and/or explosion of the rubber to permit the release of the vapor. In this manner the rubber is broken up and shredded.

It is manifest that similar treatments can be accorded other types of rubber herein disclosed and that other solutes may be used, the only requirement being that the fluid which is to be dissolved into the rubber has such properties as to permit solution at temperatures which are not injurious to rubber-like material. Obviously, when using various solutes the pressures etc., may be varied to suit the particular case, such pressures being best arrived at by trial in connection with the solute and solvent to be used. The type and condition of rubber used in the process, the condition desired in the rubber after explosion, the ease of handling the gas, and cost are some of the factors influencing the selection of a particular gas. For example, we find that ammonia is very successful when it is desired to explode rubber but not permanently alter its chemical composition in the explosion process. We have used sulphur dioxide when we wished to explode rubber and at the same time cause oxidation in it. We have used methyl chloride to explode rubber prior to using the rubber in making rubber cement.

The product of this invention may be used in a number of ways for example, the shredded unvulcanized rubber can be baled and then molded into definite shapes and used as a substitute for sponge rubber, one of such uses being particularly directed to seat cushions of automobiles. Likewise, the process may be directed to crude rubber, wherein the exploded rubber is fed directly to the mill where compounding is taking place thus reducing the milling time. Vulcanized rubber, such as, old tires, can be exploded by this method to present particles of very thin cross-section which may be easily operated upon. Thus it is apparent that the invention has a multitude of uses in connection with non-porous rubber-like material and that although a diagrammatic showing is presented, such showing does not limit the invention, since any suitable apparatus that will produce the desired effect is within the scope of our invention.

As herein defined, the words "rubber-like material" as noted in the claims will include rubber, crude, compounded, vulcanized or unvulcanized, reclaimed rubber, synthetic rubber such as polymerized chloroprene, polymerized isoprene and the like, such materials being of a non-porous nature as differentiated from wood and other porous materials.

While the embodiments of the present invention as herein disclosed, constitutes a preferred form, it is to be understood that other forms might be adopted, all coming within the scope of the claims which follow.

What is claimed is as follows:

1. The process of shredding non-porous rubber-like material taken from the class consisting of crude rubber, compounded rubber, vulcanized rubber, unvulcanized rubber, reclaimed rubber, polymerized chloroprene and polymerized isoprene comprising the steps of, dissolving ammonia in rubber-like material under high pressure, and then substantially instantaneously reducing the pressure and thereby reducing the solubility of the ammonia in the rubber-like material for causing the ammonia to be released from the rubber under explosive conditions, for breaking up the rubber-like material into small particles.

2. The process of making shredded material from rubber-like material taken from the class consisting of crude rubber, compounded rubber, vulcanized rubber, unvulcanized rubber, reclaimed rubber, polymerized chloroprene and polymerized isoprene, comprising the steps of, introducing rubber-like material into a chamber, dissolving ammonia into said rubber-like material under high pressure and then ejecting said rubber-like material with the ammonia dissolved therein into a zone of reduced pressure, whereby the solubility of the ammonia is reduced, for causing the ammonia to be released with explosive force and thereby shred the rubber-like material.

WILLIAM J. JOYCE.
HARVEY D. GEYER.